(12) United States Patent
Chiang

(10) Patent No.: US 7,367,793 B2
(45) Date of Patent: May 6, 2008

(54) MOLD WITH MOVABLE CORE INSERT

(75) Inventor: Tsung-Wei Chiang, Taipei Hsien (TW)

(73) Assignee: Hon Hai Precision Industry Co., Ltd., Tu-Cheng, Taipei Hsien (TW)

(*) Notice: Subject to any disclaimer, the term of this patent is extended or adjusted under 35 U.S.C. 154(b) by 0 days.

(21) Appl. No.: 11/561,352

(22) Filed: Nov. 17, 2006

(65) Prior Publication Data

US 2007/0190197 A1 Aug. 16, 2007

(30) Foreign Application Priority Data

Feb. 10, 2006 (CN) .......................... 200610033571

(51) Int. Cl.
*B29C 33/00* (2006.01)

(52) U.S. Cl. .................. 425/408; 425/192 R; 425/193; 425/195; 425/808

(58) Field of Classification Search ............ 425/192 R, 425/193, 195, 408, 808
See application file for complete search history.

(56) References Cited

U.S. PATENT DOCUMENTS

| 2,304,984 | A | * | 12/1942 | Wood | 264/275 |
| 2,532,501 | A | * | 12/1950 | Johnson | 264/40.5 |
| 2,559,860 | A | * | 7/1951 | Fay | 425/125 |
| 3,412,432 | A | * | 11/1968 | Fuglsang-Madsen | 425/575 |
| 3,481,000 | A | * | 12/1969 | Barfuss | 425/406 |
| 5,259,742 | A | * | 11/1993 | Ichikawa et al. | 425/47 |
| 5,773,041 | A | * | 6/1998 | Singh et al. | 425/195 |
| 6,749,416 | B2 | * | 6/2004 | Arndt et al. | 425/193 |
| 7,165,961 | B2 | * | 1/2007 | Jachimski | 425/193 |

* cited by examiner

*Primary Examiner*—Yogendra N. Gupta
*Assistant Examiner*—Seyed Masoud Malekzadeh
(74) *Attorney, Agent, or Firm*—Jeffrey T. Knapp

(57) ABSTRACT

A mold includes a first board (10), a second board (20), and a core insert (30). The first board is mounted on the second board, and the core insert is slidably mounted between the first board and the second board, under the control of an adjusting apparatus (40). The adjusting apparatus includes a movable block (41), an elastic component (42), and an adjusting screw (43).

16 Claims, 4 Drawing Sheets

MOLD WITH MOVABLE CORE INSERT

BACKGROUND OF THE INVENTION

1. Field of the Invention

The present invention generally relates to a mold and, more particularly, to a mold with a movable core insert, or the like.

2. Description of Related Art

Many kinds of workpieces need to be made via molds. Core inserts are widely used in many molds to configure workpieces. Referring to FIG. 1, a typical mold 600 includes a first subassembly 70 and a second subassembly 80. The first subassembly 70 includes a first core insert 71 and a first board 72. The second subassembly 80 includes a second core insert 81 and a second board 82. One surface of the first core insert 71 and a corresponding surface of the second core insert 81 are configured so as, together, to substantially constitute the shape of a desired workpiece (not shown). The first board 72 and the second board 82 are both flat, and each of the first mold 72 and the second board 82 defines a through hole (not labeled) therein. The first core insert 71 is mounted in the through hole of the first board 72, and the second core insert 81 is mounted in the through hole of the second board 82.

In use, the first subassembly 70 is mounted to the second subassembly 80, and the through hole of the first board 72 is aligned with the through hole of the second board 82. In this way, the first core insert 71 and the second core insert 81 cooperate with the through holes to form a cavity 90 for configuring the workpieces.

However, when the mold 600 is made, the first core insert 71 is fixed in the first board 72, and the second core insert 81 is fixed in the second board 82. Positions of the first core insert 71 and the second core insert 81, which together determine a thickness of the workpiece(s) configured by the mold 600, cannot be adjusted, and thus the mold 600 can only be used to configure workpieces having an identical thickness. When the mold 600 is used to configure workpieces having different structures or if the mold 600 suffers from error, it must be disassembled to change the positions of the first core insert 71 and the second core insert 81 to adjust thickness of the workpiece(s) produced thereby.

Therefore, a new mold is desired in order to overcome the above-described shortcomings.

SUMMARY OF THE INVENTION

In a preferred embodiment, a mold includes a first board, a second board, and a core insert. The first board is mounted on the second board, and the core insert is movably mounted between the first board and the second board.

Other advantages and novel features will become more apparent from the following detailed description when taken in conjunction with the accompanying drawings.

BRIEF DESCRIPTION OF THE DRAWINGS

Many aspects of the mold can be better understood with reference to the following drawings. The components in the drawings are not necessarily drawn to scale, the emphasis instead being placed upon clearly illustrating the principles of the mold. Moreover, in the drawings, like reference numerals designate corresponding parts through out the several views.

DETAILED DESCRIPTION OF THE INVENTION

Figure 1:
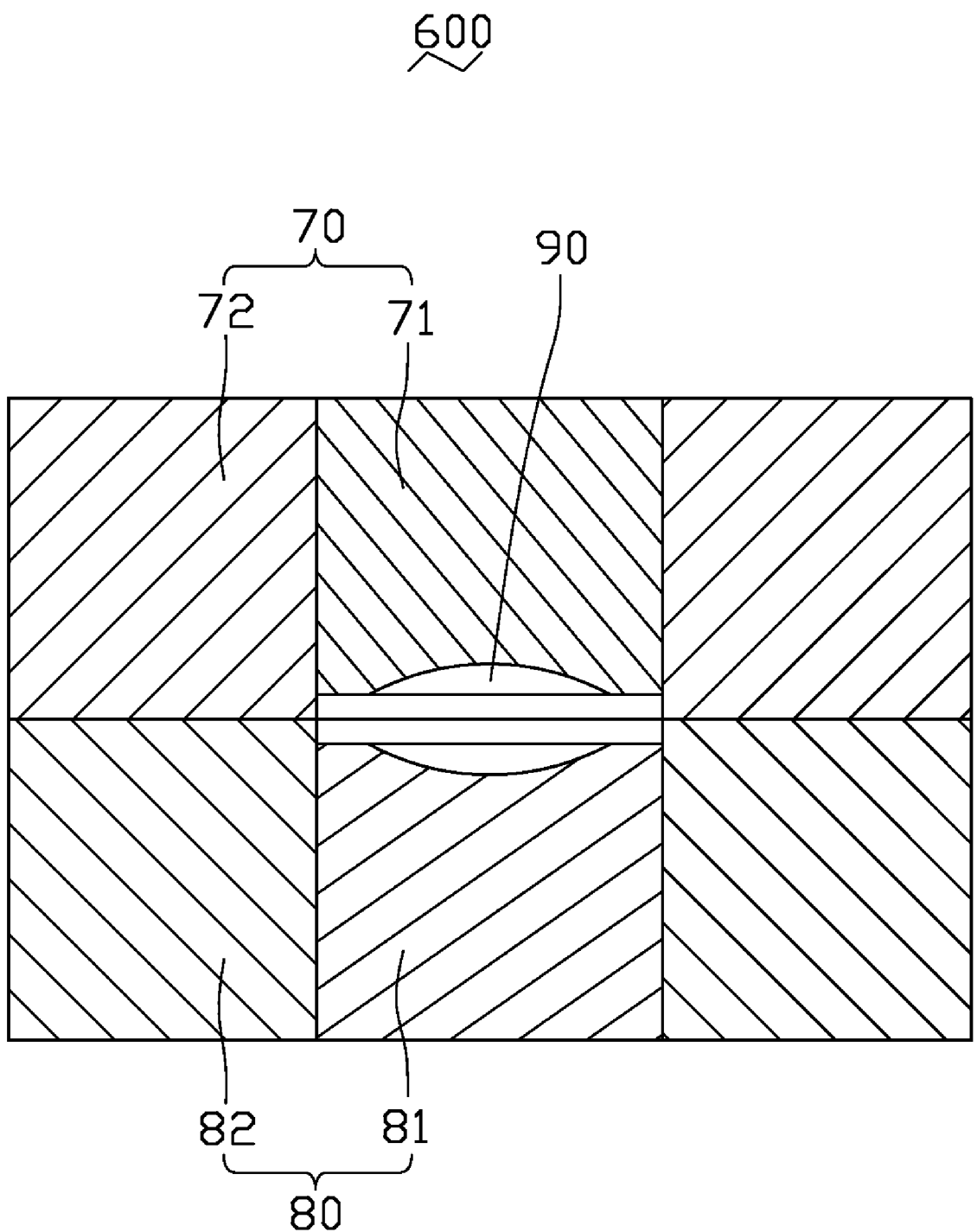
FIG. 1 is a schematic view of a typical mold.
Figure 2:
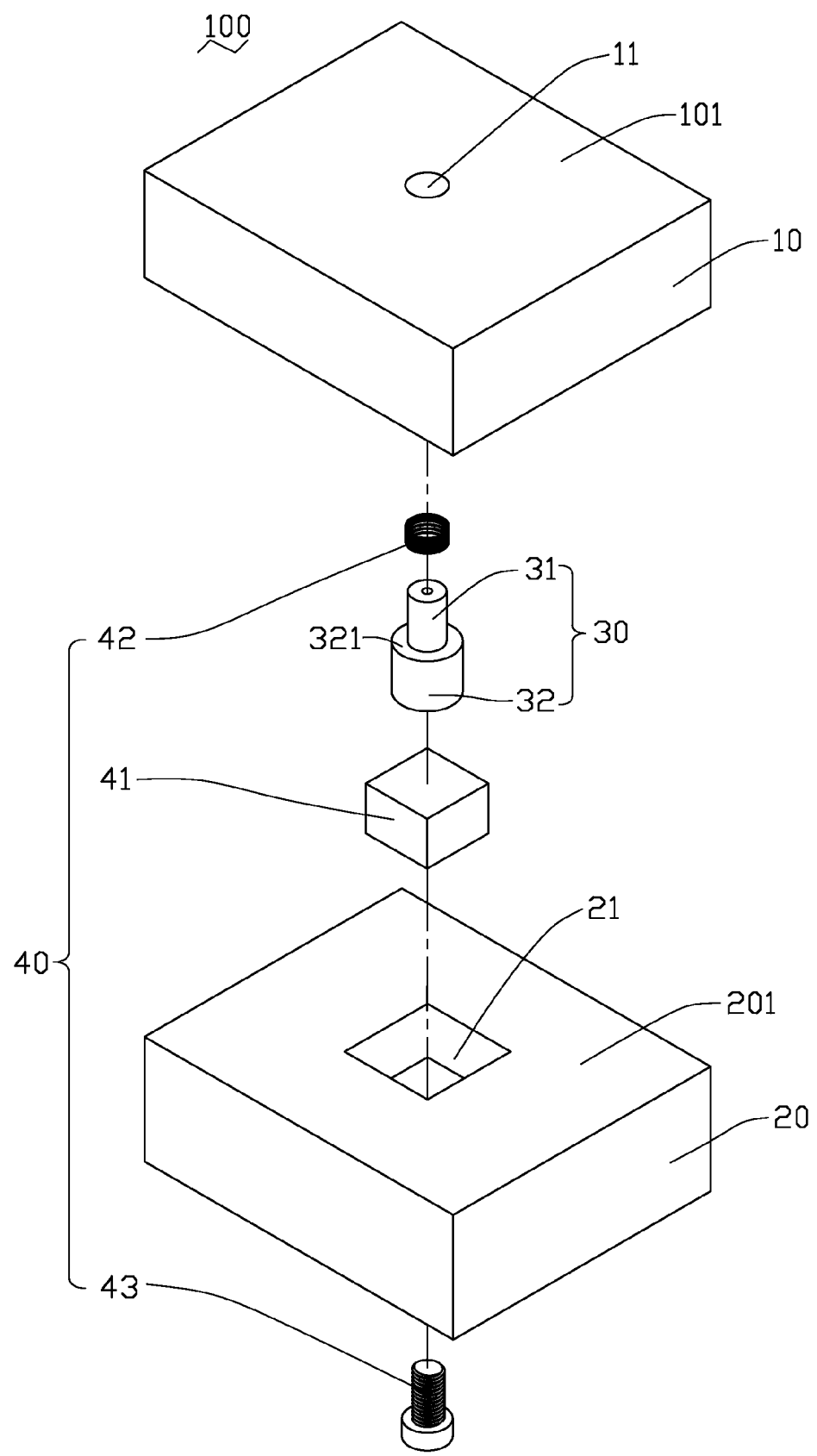
FIG. 2 is a disassembled, schematic view of a mold in accordance with a preferred embodiment.
Figure 3:
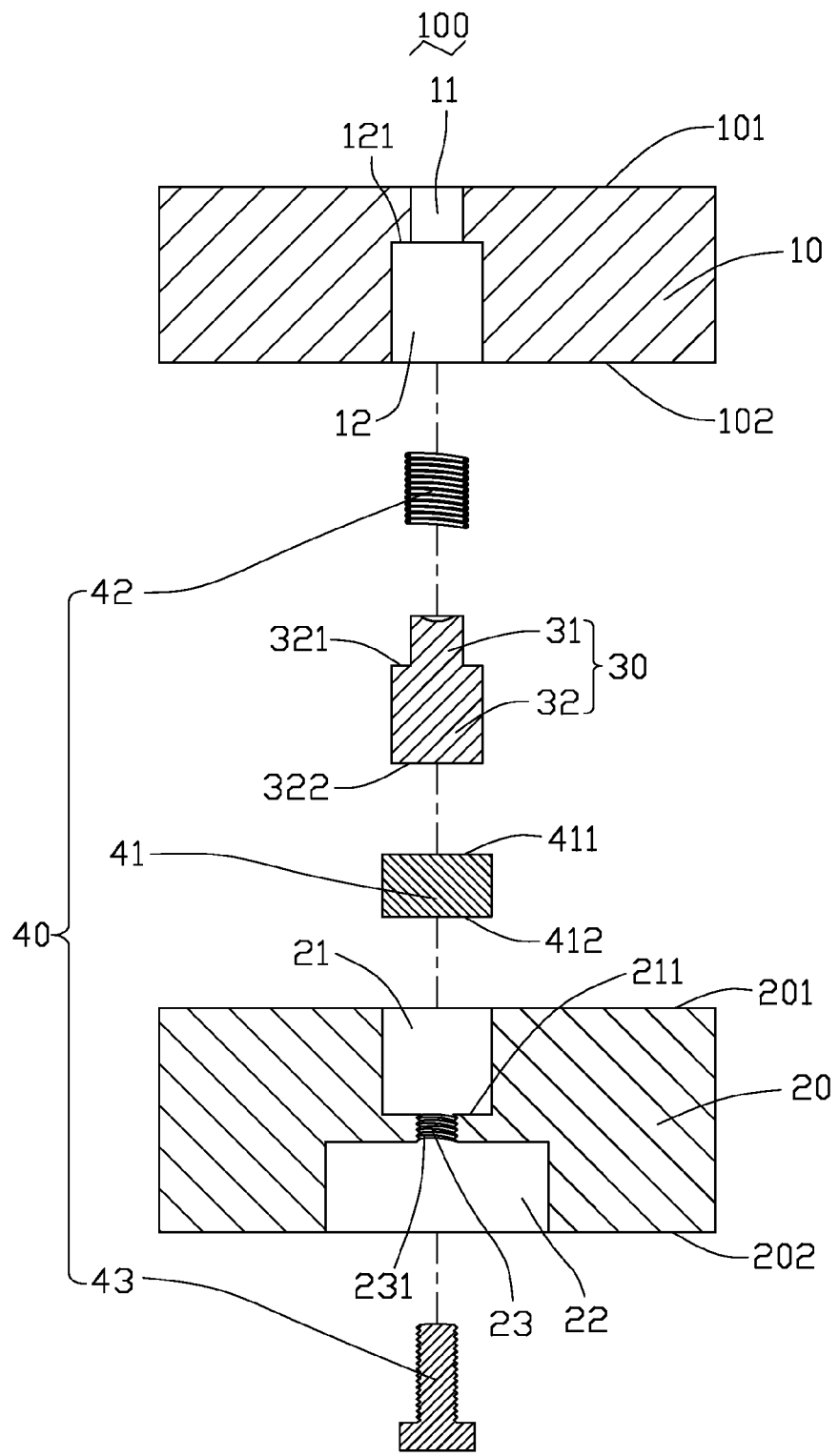
FIG. 3 is a disassembled, cut-away view of the mold in FIG. 2.

Referring now to the drawings in detail, FIG. 2 and FIG. 3 shows a mold 100, in accordance with a preferred embodiment. The mold 100 includes a first board 10, a second board 20, a core insert 30, and an adjusting apparatus 40. The core insert 30 is movably mounted between the first board 10 and the second board 20, and the adjusting apparatus 40 is configured for selectably changing a position of the core insert 30.

The first board 10 includes a working surface 101 and a first mounting surface 102. The first mounting surface 102 is a plane located opposite to the working surface 101. The first board 10 defines a containing hole 11 and a containing groove 12 therein. The containing hole 11 is a cylindrical through hole defined on the working surface 101, and the containing groove 12 is a round recess defined on the first mounting surface 102. The containing hole 11 coaxially communicates with the containing groove 12 in the first board 10. A diameter of the containing hole 11 is less than a diameter of the containing groove 12. As such, an annular step 121 is formed as part of the first board 10 within the interior thereof at the place where the containing hole 11 communicates with the containing groove 12.

The second board 20 includes a second mounting surface 201 and an installing surface 202. The second mounting surface 201 is a plane located opposite to the installing surface 202. The second board 20 has an adjusting groove 21 defined directly in the second mounting surface 201 thereof and has an installing groove/recess 22 formed in (i.e., extending inwardly from) the installing surface 202. The adjusting groove 21 is a rectangular recess, and a plane 211 corresponding to the adjusting groove 21 is formed in the second board 20. A width of the adjusting groove 21 is larger than a diameter of the containing groove 12. An adjusting hole 23 is also defined in the second board 20. The adjusting hole 23 communicates between the adjusting groove 21 and the installing groove 22. The adjusting hole 23 is a cylindrical through hole and is aligned with a center of the plane 211. Screw threading 231 is formed in the adjusting hole 23.

The core insert 30 includes a configuring portion 31 and a driving portion 32. The configuring portion 31 and the driving portion 32 are both cylinders, and the configuring portion 31 is coaxially connected to the driving portion 32. A diameter of the configuring portion 31 is equal to the diameter of the containing hole 11, and a diameter of the driving portion 32 is equal to the diameter of the containing groove 12, thereby facilitating respective precision slide fits of the configuring portion 31 and the driving portion 32. An end of the configuring portion 31 has a shape corresponding to the at least one workpiece shaped by the mold 100 (i.e., a mold 100 could, within the scope of the present embodiment, be designed to mold either a single workpiece or multiple workpieces). The driving portion 32 includes a connecting surface 321 and a driving surface 322 located opposite to the connecting surface 321. The configuring portion 31 is connected to (i.e., extends directly from) the connecting surface 321. The connection therebetween could be, e.g., mechanical, metallurgical (e.g., welded), or integral, in nature.

The adjusting apparatus 40 includes a movable block 41, an elastic component 42, and an adjusting screw 43. The movable block 41 has a rectangular shape corresponding to the adjusting groove 21 and can slidably move in the adjusting groove 21. The movable block 41 includes a contacting surface 411 and a driving surface 412 defined opposite to the contacting surface 411. The elastic component 42 is a cylindrical spring, which has a diameter that is larger than the diameter of the configuring portion 31 and less than the diameter of the driving portion 32. The elastic component 42 is particularly configured for surrounding (i.e., coiling around) the configuring portion 31 and biasing against both the annular step 121 of the first board 10 and the connecting surface 321 of the driving portion 32. The adjusting screw 43 can be selectably moved in the adjusting hole 23 relative to the screw threading 231 therein.

Figure 4:
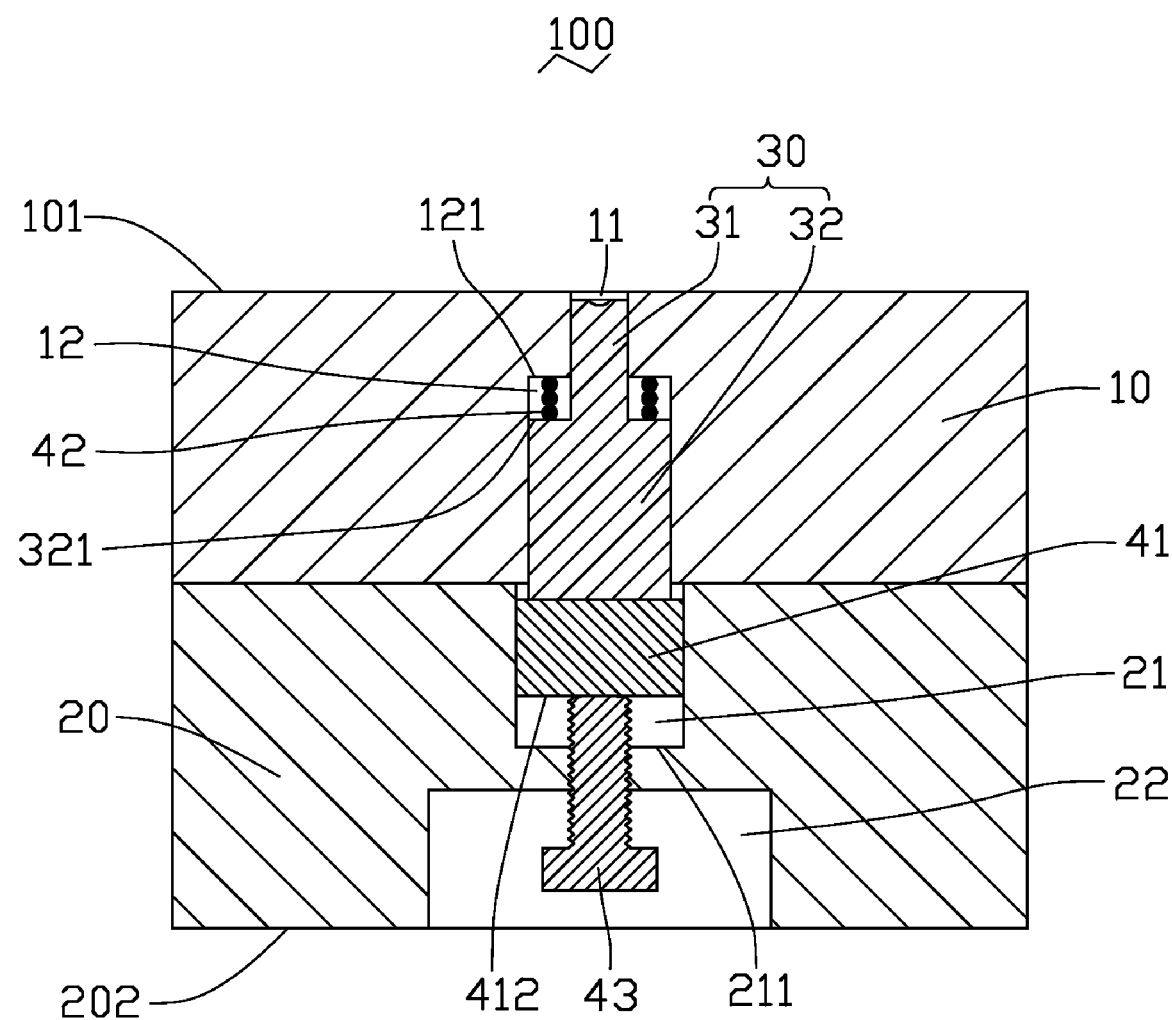
FIG. 4 is an assembled, cut-away view of the mold in FIG. 2.

Also referring to FIG. 4, in assembly, the elastic component 42 is coiled around the configuring portion 31 of the core insert 30, the configuring portion 31 is inserted into the containing hole 11 via the containing groove 12, and the driving portion 32 is positioned corresponding to the containing groove 12. In this way, the core insert 30 is mounted in the containing hole 11 and the containing groove 12, and the core insert 30 can stably move along a concentric axis of the configuring portion 31 and the driving portion 32 in the containing hole 11 and the containing groove 12. One end of the elastic component 42 is held/retained by the step 121, and the other end of the elastic component 42 is held/retained by the connecting surface 321.

The movable block 41 is slidably mounted in the adjusting groove 21. The adjusting screw 43 is screwed into the adjusting hole 23 from the installation surface 202 until one end of the adjusting screw 43 is in biasing contact with the driving surface 412 of the movable block 41. In this way, when the adjusting screw 43 is rotated to move towards the working surface 101, the movable block 41 is pushed by the adjusting screw 43 to move along an axis of the adjusting screw 43 in the adjusting groove 21. When the adjusting screw 43 is rotated to move towards the installing surface 202, the core insert 30 and the movable block 41 are pushed towards the installing surface 202 due to the resilience of the elastic component 42.

The first board 10 is then mounted on the second board 20, and the first mounting surface 102 is fixed in tight contact with the second mounting surface 201. In this way, the core insert 30 is mounted between the first board 11 and the second board 12. The connecting surface 321 of the core insert 30 is pressed by the elastic component 42, and the driving surface 322 is pressed to be in tight contact with the contacting surface 411 of the movable block 41. Understandably, to help ensure that the first board 10 can be mounted relative to a proper place of the second board 20, a plurality of leading/guide poles (not shown) can be formed on the first board 10, and a plurality of mating leading/guide holes (not shown), corresponding to the leading poles, can be formed on the second board 20.

In use, the mold 100 is mounted on another mold 100 (not shown), the two working surfaces 101 of the two molds 100 are fixed in tight contact with each other, and, accordingly, the containing holes 11 are aligned with each other. In this way the core inserts 30 and the containing holes 11 form a cavity (not shown) for configuring workpieces. When a thickness of the workpieces configured by the molds 100 needs to be adjusted, a relative position of each core insert 30 can be adjusted. In using each mold 100, in order to reduce a thickness of the workpieces, at least one core insert 30 can be moved towards the working surface 101. To instead increase the thickness thereof, one or both respective core inserts 30 can be moved towards the installation surface 202.

When a given core insert 30 needs to be moved, the adjusting screw 43 is rotated to move along its axis. When the adjusting screw 43 moves towards the working surface 101, the movable block 41 is pushed towards the working surface 101 by the adjusting screw 43, and the core insert 30 is pushed towards the working surface 101. When the adjusting screw 43 moves towards the installing surface 202, the core insert 30 and the movable block 41 are pushed towards the installing surface 202 by the elastic component 42. Understandably, the movable block 41 is rectangular and the driving portion 32 of the core insert 30 is cylindrical. Therefore, when the adjusting screw 43 is rotated, the movable block 41 does not and cannot rotate with the adjusting screw 43. As such, the moving core insert 30 does not rotate either, and workpieces shaped by the mold 100 are prevented from becoming distorted as a result of unwanted angular movement of a given core insert 30. Additionally, so long as the core insert 30 can only move axially (i.e., rotation of the movable block 41 and the core insert 30 is prevented, even upon turning of the adjusting screw 43) in the adjusting groove 21, the adjusting groove 21 and the movable block 41 can have other shapes corresponding to each other.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A mold, comprising:
a first board;
a second board including an adjusting groove mounted on the first board; and
a core insert mounted between the first board and the second board, the core insert being configured to move without rotation relative to the first board and the second board, wherein the mold includes an adjusting apparatus, the adjusting apparatus including a movable block which the movable block being movably mounted in the adjusting groove, and further the adjusting apparatus includes an elastic component, the elastic component being a cylindrical spring, a diameter of the elastic component being larger than the diameter of a configuring portion of the core insert and less than the diameter of a driving portion of the core insert.

2. The mold as claimed in claim 1, wherein the first board defines a containing hole and a containing groove communicating with the containing hole.

3. The mold as claimed in claim 2, wherein the containing hole is a cylindrical through hole and the containing groove is a round recess coaxially communicating with the containing hole, a diameter of the containing hole being less than a diameter of the containing groove, the first board having an annular step formed in an interior thereof, the annular step being located at the place where the containing hole communicates with the containing groove.

4. The mold as claimed in claim 3, wherein the second board further comprises an installing groove, a width of the adjusting groove being larger than a diameter of the containing groove.

5. The mold as claimed in claim 4, wherein the second board defines an adjusting hole therein, the adjusting hole communicating with the adjusting groove and the installing groove, and the adjusting hole having screw threading fanned therein.

6. The mold as claimed in claim 4, wherein the core insert includes a configuring portion and a driving portion, the configuring portion and the driving portion both being cylinders, the configuring portion being coaxially connected to the driving portion, a diameter of the configuring portion being equal to the diameter of the containing hole, a diameter of the driving portion being equal to the diameter of the containing groove.

7. The mold as claimed in claim 6, wherein the driving portion includes a connecting surface, the configuring portion being connected to the connecting surface.

8. The mold as claimed in claim 6, wherein the elastic component is coiled around the configuring portion of the core insert, one end of the elastic component biasing against the annular step of the core insert and another end of the elastic component biasing against the connecting surface.

9. The mold as claimed in claim 6, wherein the adjusting apparatus includes an adjusting screw, the adjusting screw is movably mounted in the adjusting hole.

10. A mold, comprising:
a first board defining a containing hole and a containing groove therein, the containing groove communicating with the containing hole; further a second board comprises an adjusting groove; and
a core insert mounted in the containing hole and the containing groove, the core insert being configured to move without rotation relative to the first board, wherein the mold includes an adjusting apparatus, the adjusting apparatus including a movable block which the movable block being slidably mounted in the adjusting groove, and further the adjusting apparatus includes an elastic component, the elastic component being a cylindrical spring, a diameter of the elastic component being larger than the diameter of a configuring portion of the core insert and less than the diameter of a driving portion of the core insert.

11. The mold as claimed in claim 10, wherein the containing bole is a cylindrical trough hole and the containing groove is a round recess, the containing groove coaxially communicating with the containing hole, a diameter of the containing hole being less than a diameter of the containing groove, the first board having an annular step formed in an interior thereof, the annular step being located at the place where the containing hole communicates with the containing groove.

12. The mold as claimed in claim 11, wherein, the second board further comprises an installing groove therein, and wherein the width of the adjusting groove being larger than a diameter of the containing groove.

13. The mold as claimed in claim 12, wherein the second board defines an adjusting hole therein, the adjusting hole communicating with the adjusting groove and the installing groove, and the adjusting hole having screw threading formed therein.

14. The mold as claimed in claim 12, wherein the core insert includes a configuring portion and a driving portion, the configuring portion and the driving portion both being cylinders, the configuring portion being coaxially connected to the driving portion, a diameter of the configuring portion being equal to the diameter of the containing hole, and a diameter of the driving portion being equal to the diameter of the containing groove.

15. The mold as claimed in claim 14, wherein the mold includes an adjusting apparatus, the adjusting apparatus includes an adjusting screw, the adjusting screw is movably mounted in the adjusting hole.

16. The mold as claimed in claim 14, wherein the driving portion includes a connecting surface, the configuring portion being connected to the connecting surface, the elastic component being coiled around the configuring portion of the core insert, one end of the elastic component being retained by the annular step of the core insert and another end of the elastic component being retained by the connecting surface.

* * * * *